US011510421B2

(12) United States Patent
Yifrach (10) Patent No.: US 11,510,421 B2
(45) Date of Patent: Nov. 29, 2022

(54) APPARATUS FOR MAKING TEXTURE CONTROLLED EDIBLE ICE PRODUCTS INSTANTLY (71) Applicant: MRGRANITA LTD., Rosh-Haayin (IL)

(72) Inventor: Amichai Haim Yifrach, Kdumim (IL)

(73) Assignee: MRGRANITA LTD., Rosh-Haayin (IL)

( * ) Notice: Subject to any disclaimer, the term of this patent is extended or adjusted under 35 U.S.C. 154(b) by 220 days.

(21) Appl. No.: 17/058,402

(22) PCT Filed: Dec. 26, 2019

(86) PCT No.: PCT/IL2019/051413
§ 371 (c)(1),
(2) Date: Nov. 24, 2020

(87) PCT Pub. No.: WO2020/170238
PCT Pub. Date: Aug. 27, 2020

(65) Prior Publication Data
US 2021/0195913 A1    Jul. 1, 2021

(30) Foreign Application Priority Data

Feb. 20, 2019  (IL) .......................................... 264930

(51) Int. Cl.
*A23G 9/04* (2006.01)
*A23G 9/12* (2006.01)
(Continued)

(52) U.S. Cl.
CPC ............... *A23G 9/045* (2013.01); *A23G 9/12* (2013.01); *A23G 9/20* (2013.01); *A23G 9/224* (2013.01); *A23G 9/228* (2013.01)

(58) Field of Classification Search
CPC .......... A23G 9/045; A23G 9/06; A23G 9/086; A23G 9/10; A23G 9/106; A23G 9/12;
(Continued)

(56) References Cited

U.S. PATENT DOCUMENTS 3,503,757 A * 3/1970 Rubenstein ............... A23G 9/46
                                                                426/317
3,543,695 A * 12/1970 Rubenstein ............... A23G 9/20
                                                                366/177.1
(Continued)

FOREIGN PATENT DOCUMENTS

EP    0659351 A1    9/1994
EP    2557150 A1    2/2013
(Continued)

OTHER PUBLICATIONS

International Search Report for PCT/IL2019/051413, dated Mar. 24, 2020; 5 pages.
(Continued)

*Primary Examiner* — Miguel A Diaz
(74) *Attorney, Agent, or Firm* — Roach Brown McCarthy & Gruber, P.C.; Kevin D. McCarthy (57) ABSTRACT The present invention relates to an apparatus for producing edible ice products comprising: (a) a thermally insulated food grade material chamber; (b) at least one atomizing beverage nozzle(s) inserted in said thermally insulated chamber for spraying beverage droplets into said thermally insulated chamber; (c) at least one beverage valve(s), disposed between a beverage source and said atomizing beverage nozzle(s), for controlling the beverage flow rate into said chamber; (d) at least one gas expansion nozzle(s), inserted in said thermally insulated chamber, for expanding the gas in its liquid state to its gaseous state, and for jetting gas on said beverage droplets, in said thermally insulated chamber; (e) at least one gas flow regulator(s), disposed between a gas source and said gas nozzle(s) for regulating the gas flow rate into said gas expansion nozzle (s); (f) a controller for controlling said beverage valve(s) and said gas flow regulator(s); and (g) wherein said controller controls said beverage valve(s) and said gas flow regulator(s) for (Continued)

ensuring that said sprayed beverage droplets meet the jetted gas for freezing said droplets for forming a texture controlled edible ice product in said thermally insulated chamber.

11 Claims, 6 Drawing Sheets

(51) Int. Cl.
*A23G 9/20* (2006.01)
*A23G 9/22* (2006.01)

(58) Field of Classification Search
CPC . A23G 9/16; A23G 9/166; A23G 9/20; A23G 9/222; A23G 9/224; A23G 9/228; A23G 9/46
See application file for complete search history.

(56) References Cited

U.S. PATENT DOCUMENTS

| | | | |
|---|---|---|---|
| 3,823,571 A | 7/1974 | Smith et al. | |
| 4,755,060 A * | 7/1988 | Pedersen | B01F 27/923 366/186 |
| 10,426,180 B1 * | 10/2019 | Fonte | A23G 9/224 |
| 10,595,544 B2 * | 3/2020 | Beth Halachmi | A23G 9/045 |
| 10,973,240 B1 * | 4/2021 | Fonte | A23G 9/22 |
| 2009/0016150 A1 * | 1/2009 | Mimran | A23G 9/24 366/134 |
| 2013/0177691 A1 | 7/2013 | Berghoff et al. | |
| 2016/0353766 A1 | 12/2016 | Jacobsen et al. | |
| 2017/0360059 A1 | 12/2017 | Fisher et al. | |
| 2019/0053513 A1 | 2/2019 | Beth Halachmi | |
| 2020/0146311 A1 | 5/2020 | Beth Halachmi | |
| 2021/0212337 A1 * | 7/2021 | Fonte | B01F 35/322 |

FOREIGN PATENT DOCUMENTS

| | | | | |
|---|---|---|---|---|
| EP | 2560502 A1 | 2/2013 | | |
| EP | 2775855 | 8/2013 | | |
| EP | 3032961 | 2/2015 | | |
| EP | 3302091 | 12/2016 | | |
| WO | 2012160532 A1 | 11/2012 | | |
| WO | 2013121421 A1 | 8/2013 | | |
| WO | WO-2013121421 A1 * | 8/2013 | | A23G 9/00 |
| WO | WO-2015063094 A1 * | 5/2015 | | A23G 9/08 |
| WO | WO-2018054749 A1 * | 3/2018 | | A23G 9/08 |
| WO | 2018/122277 A1 | 7/2018 | | |
| WO | WO-2019140251 A1 * | 7/2019 | | A23G 9/12 |
| WO | WO-2020136137 A1 * | 7/2020 | | A23G 9/045 |

OTHER PUBLICATIONS

Written Opinion of International Searching Authority for PCT/IL2019/051413, dated Mar. 24, 2020; 4 pages.

Communicaiton and Supplementary European Search Report for EP 19 91 5928; dated Mar. 16, 2022 (11 pages).

* cited by examiner

APPARATUS FOR MAKING TEXTURE CONTROLLED EDIBLE ICE PRODUCTS INSTANTLY

TECHNICAL FIELD

The present invention relates to an apparatus for making edible ice products. More particularly, to an apparatus for instantly making iced beverages, such as slush drinks.

BACKGROUND

As of today, refreshing iced beverages are available for consumers in many flavors and colors. These cold beverages are very popular, especially in the hot days of the summer. Some of these beverages, such as slush drinks, are made by constantly agitating a strongly refrigerated beverage concentrate. Such scraped beverages contain small rough ice fragments and have a slurry-like mouthfeel. Other iced beverages may be produced by blending and crushing ice cubes with a flavored drink, to produce a beverage with ice flakes distributed in the drink. This method typically relies on a high-speed blender having sharp cutting blades.

U.S. Pat. No. 3,823,571 discloses a machine for dispensing a semi-frozen carbonated beverage. The disclosed machine includes a cooling chamber, means for delivering liquid ingredient to the chamber, means for delivering carbon dioxide gas to the chamber, and refrigeration means for maintaining the liquid ingredient in the chamber to a prescribed viscosity and temperature range. The temperature and viscosity of the liquid ingredient, and the pressure within the chamber, are maintained within prescribed ranges during a first operating mode of the machine to produce a semi-frozen carbonated beverage. The automatic mode control of the machine controls the refrigeration means and liquid and gas delivering means such that during a first operating mode, said viscosity, temperature, and pressure ranges are maintained. Delivery of both liquid and gas ingredients is allowed to the chamber, during a second operating mode where the liquid ingredient within the chamber is defrosted. During a period of time between first operating modes the delivery of gas is allowed to the chamber and the supply of liquid ingredient to the chamber is shut off. However, the described machine is intended for producing carbonated beverages.

WO 2018/122277 discloses a method for preparing an ice-containing tea or coffee beverage. The disclosed method comprises: (i) providing a beverage liquor, containing soluble tea or coffee solids, and a freezing-point suppressant; (ii) aerating the beverage liquor by the addition of a gas; (iii) flowing the aerated beverage liquor through a refrigeration system, to cool the aerated beverage liquor and to thereby form a plurality of ice crystals, within the aerated beverage liquor; and (iv) dispensing the cooled aerated beverage liquor as an ice-containing tea or coffee beverage. However, the described method is costly.

It would therefore be desired to propose a system void of these deficiencies.

SUMMARY

It is an object of the present invention to provide an apparatus for making texture controlled edible ice products instantly.

It is another object of the present invention to provide a portable apparatus for making slush drinks.

It is still another object of the present invention to provide an apparatus for instantly making iced beverages, where each beverage's flavor and texture may be controlled.

Other objects and advantages of the invention will become apparent as the description proceeds.

The present invention relates to an apparatus for producing edible ice products comprising: (a) a thermally insulated food grade material chamber; (b) at least one atomizing beverage nozzle(s) inserted in said thermally insulated chamber for spraying beverage droplets into said thermally insulated chamber; (c) at least one beverage valve(s), disposed between a beverage source and said atomizing beverage nozzle(s), for controlling the beverage flow rate into said chamber; (d) at least one gas expansion nozzle(s), inserted in said thermally insulated chamber, for expanding the gas in its liquid state to its gaseous state, and for jetting gas on said beverage droplets, in said thermally insulated chamber; (e) at least one gas flow regulator(s), disposed between a gas source and said gas nozzle(s) for regulating the gas flow rate into said gas expansion nozzle(s); (f) a controller for controlling said beverage valve(s) and said gas flow regulator(s); and (g) wherein said controller controls said beverage valve(s) and said gas flow regulator(s) for ensuring that said sprayed beverage droplets meet the jetted gas for freezing said droplets for forming a texture controlled edible ice product in said thermally insulated chamber.

Preferably, the apparatus further comprises a shredder for texture processing.

In one embodiment, the apparatus beverage source is a capsule.

Preferably, the capsule has a predefined recipe, and where the controller can read said recipe and can control the beverage valve(s) and the gas flow regulator(s) according to said recipe.

Preferably, the controller can control the beverage valve(s) and the gas flow regulator(s) according to the beverage from the beverage source and according to the desired texture of the iced edible product.

In one embodiment, the controller controls the beverage valve(s) and the gas flow regulator(s) according to a predefined recipe.

In one embodiment, the recipe is entered to the apparatus from an external source.

In one embodiment, the controller controls the beverage valve(s) and the gas flow regulator(s) in order to create a desired texture(s) of the iced edible product consistently.

Preferably, the chamber has a rotating spiral edge, for scraping icing formations accumulated on the chamber inner surface.

Preferably, the chamber has an Archimedes screw.

BRIEF DESCRIPTION OF THE DRAWINGS

The accompanying drawings, and specific references to their details, are herein used, by way of example only, to illustratively describe some of the embodiments of the invention.

In the drawings.

DETAILED DESCRIPTION

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

Figure 1:
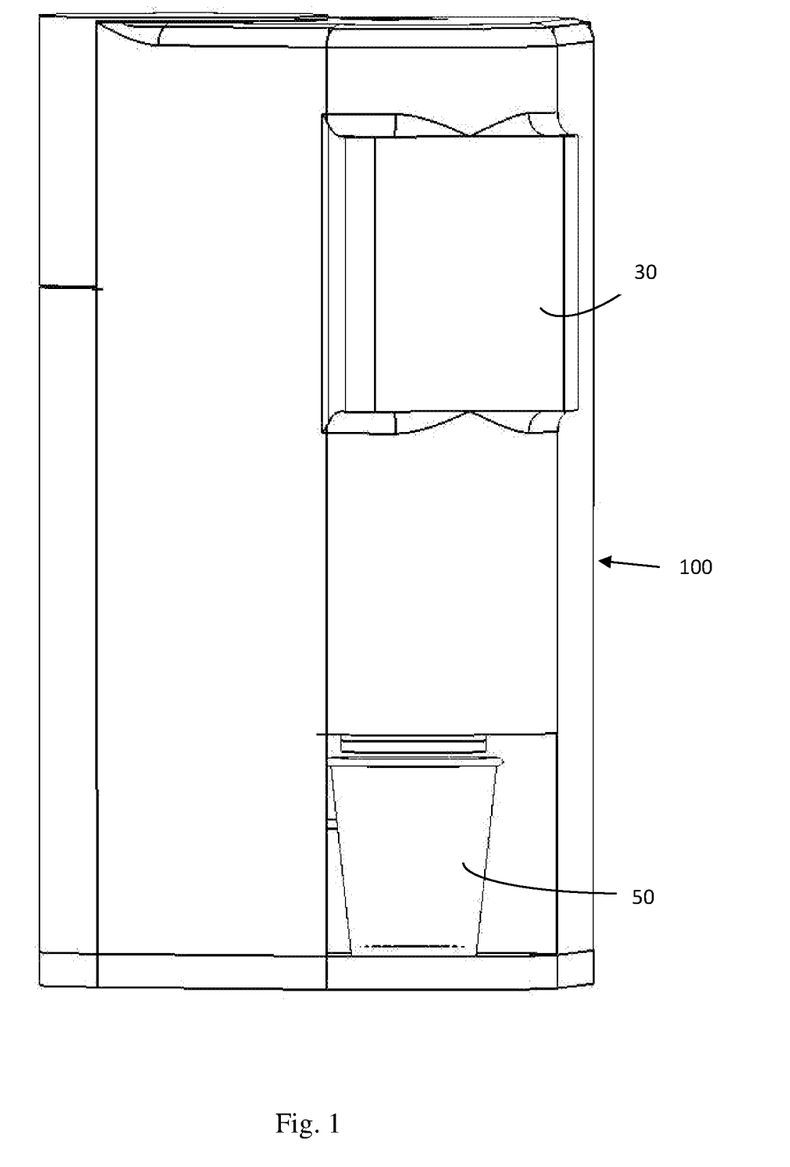
FIG. 1 is a diagram of an apparatus for producing edible ice products, according to an embodiment of the invention.

FIG. 1 is a diagram of an apparatus for producing edible ice products, according to an embodiment of the invention. In this embodiment, the apparatus 100 may be used to produce iced beverages, such as slush drinks, ice coffee, ice tea, ice juice, iced liquors, iced alcohol beverages, etc. For example, a cup, such as cup 50, may be inserted into the apparatus 100 and a slush beverage may be produced, by the apparatus 100, and dropped into the cup 50. The apparatus 100 may produce the iced beverage by jetting gas, on sprayed beverage droplets, in a thermally insulated food grade material chamber. In one embodiment, the evaporation process of the jetted gas extracts heat from the beverage droplets causing the beverage droplets temperature to drop below the freezing point, thus becoming ice nuclei. The iced nuclei may then collide with other ice nuclei, in the insulated chamber, effectively becoming beverage-flakes, e.g. edible snowflakes. The beverage-flakes may eventually drop into the cup 50, which is positioned under the insulated chamber, as will be described in greater details in relations to FIG. 2.

In one embodiment the apparatus 100, as described in relations to FIG. 1, may have a control panel, such as panel 30, having buttons, touch screen, etc. for commanding the apparatus, which controls the flow of gas and beverage in the insulated chamber. In an embodiment, the apparatus 100 may receive commands wirelessly using Wi-Fi, Bluetooth or any other remote communication for controlling the apparatus. In some embodiments the texture of the produced beverage may be directly controlled by the control panel 30, and/or by wireless communication means. In some embodiments the flavor of the produced beverage may be directly controlled by the control panel 30, and/or by wireless communication means. In some embodiments some of the texture and/or some of the flavors of the produced beverage may be predefined in the apparatus. In some embodiments some of the textures and/or flavors of the produced beverages may be predefined according to preset parameters. In one embodiment, the beverage source, of the apparatus, may be an external capsule, which may be attached to the apparatus. The capsule may be a pod, a capsule, or any encapsulated container containing beverage making ingredients, such as concentrates, liquid or solid form. In one embodiment the texture and flavor of the produced beverage may be predefined in capsule, used for producing the beverage, which has the recipe for the controller for producing the required texture and/or flavor of the beverage.

Figure 2:
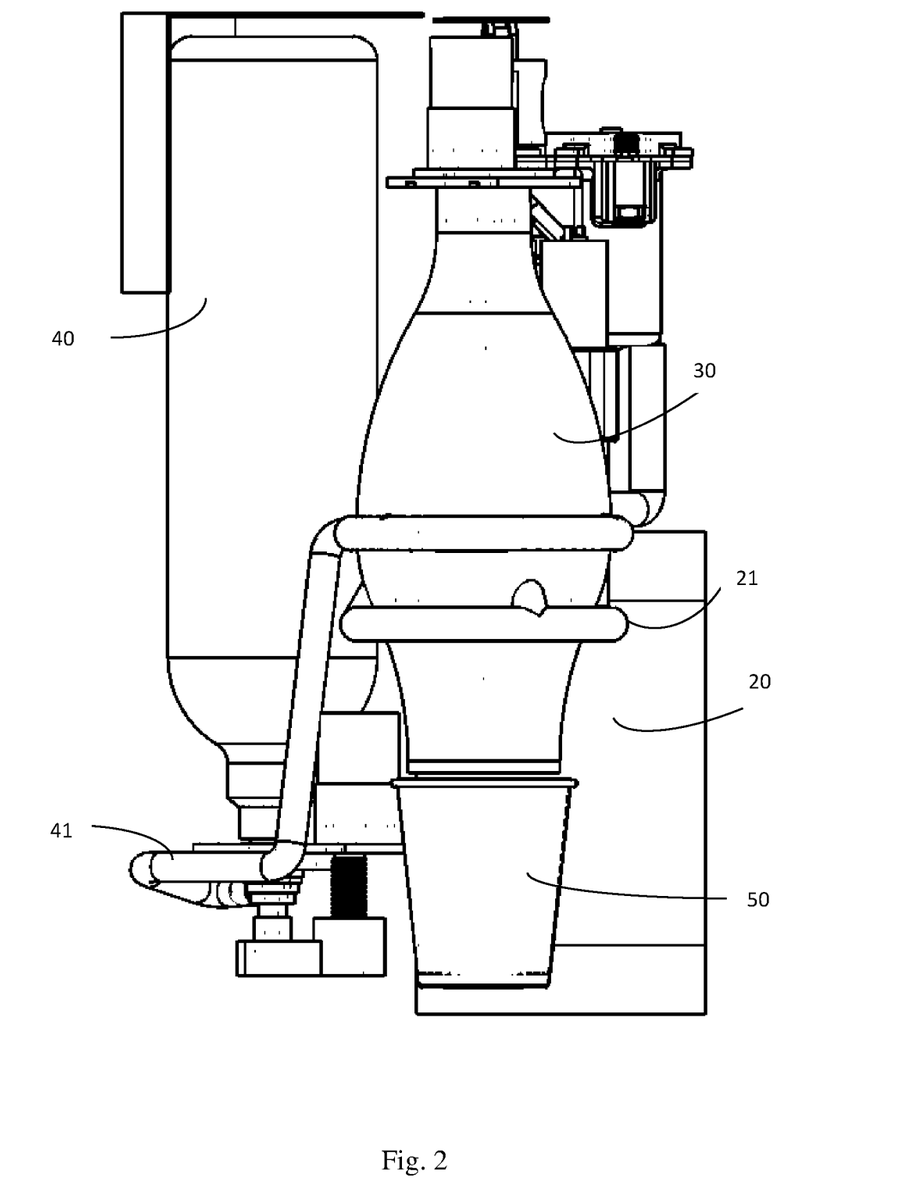
FIG. 2 is a diagram of the inner parts of the apparatus for producing edible ice products, according to an embodiment of the invention.

FIG. 2 is a diagram of the inner parts of the apparatus for producing edible ice products, according to an embodiment of the invention. In this diagram the outer cover and some of the parts of the apparatus have been removed for depicting some of the inner parts of the apparatus 100, as described in relations to FIG. 1. In the thermally insulated food grade material chamber 30, the gas is jetted over the sprayed beverage droplets in order to cool and freeze the droplets into ice nuclei. Chamber 30 may be any vessel that is thermally insulated, i.e. that its inner temperature can be controlled, and may be made of any food grade material such as SS304/316, and/or may be coated with water/ice phobic material or any other coating such as silicon or PTFE. According to one embodiment, the Chamber 30 may have a fixed geometry and volume. According to one embodiment, the chamber 30 may have a fixed aerodynamic "flap" like geometry, as will be described in relations to FIG. 5 for example. According to another embodiment, the chamber's 30 geometry and volume may have some morphism, where chamber 30 walls may be expanding walls, using air or motorized actuation systems, or walls made of expanding material or may have changing aerodynamic "flap" like geometric construction. According to an embodiment, the apparatus 100 may have a source of beverage as well, such as container 20, where liquids may be stored such as water, coffee, juice, or any other beverage. The beverage may flow to the chamber 30 using pipes, such as pipe 21, to the atomizing nozzle(s) (not shown), which may be inserted in said thermally insulated chamber 30. According to an embodiment, the apparatus 100 may have a gas source as well, such as gas cylinder 40, where the gas may be stored in pressure. In one embodiment the gas cylinder 40 stores $CO_2$ gas that is pressurized and kept in liquid state. Other gases may be used as well, which are qualified to use with beverages, and where the gas boiling point is below water freezing temperature at 1 atm of pressure, such as $N_2$. In some cases, the gas is liquified in the cylinder. The gas may flow to the chamber 30 using pipes, such as pipe 41 to the gas expansion nozzle(s) (not shown) which may be inserted in the chamber 30. In one embodiment, the gas expansion nozzle(s), expand the gas, in its liquid state, to its gaseous state, for jetting the gas on the beverage droplets, in the thermally insulated chamber 30.

Figure 3:
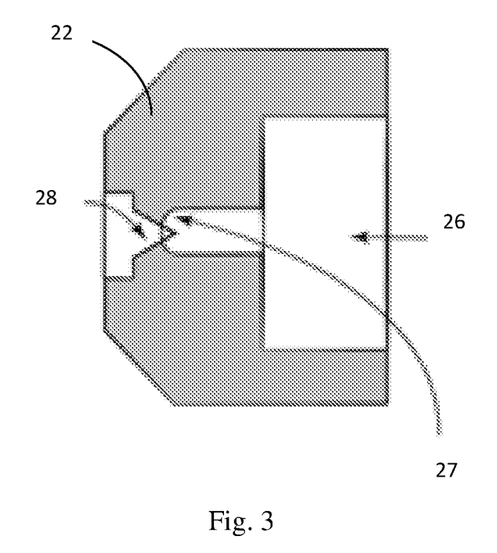
FIG. 3 is a diagram of beverage nozzle for spraying beverage droplets into the chamber, according to an embodiment of the invention.

FIG. 3 is a diagram of a beverage nozzle for spraying beverage droplets into the chamber, according to an embodiment of the invention. In one embodiment at least one atomizing beverage nozzle, such as nozzle 22, is inserted in the thermally insulated chamber, for spraying beverage droplets, from a beverage source, into the chamber, as described in relations to FIG. 2. The beverage may enter through the inlet 26 to the semispherical outlet 27 which may spray the beverage through the "V" notch 28. In other embodiments, other atomizing nozzles may be used. In one embodiment, 3 atomizing beverage nozzles are used. In one embodiment the atomizing beverage nozzles are attached to the pipe that is connected to the beverage source, where the beverage may flow from the beverage source through the pipe and through the atomizing beverage nozzles and into the insulated chamber. In one embodiment, each nozzle is directed at about 30 degrees from the vertical axis of the chamber towards the chamber center. In other embodiments, each nozzle may be directed between 0-90 degrees from the vertical axis of the chamber towards the chamber center. In one embodiment the angle of the nozzles may be dynamically changed. The number of nozzles, their type and direction may vary according to the other parameters and/or the required end product. In some embodiments compressed air may be used with an air water nozzle to create the desired beverage atomization.

In one embodiment, at least one beverage valve(s), may be disposed between the beverage source, such as container 20, described in relations to FIG. 2, and the atomizing beverage nozzle(s), described in relations to FIG. 3, for controlling the beverage flow rate into the chamber 30. The term "valve" refers to any flow control means such as a spigot, pump, faucet, etc. that may be used for controlling the flow of liquids. The beverage valve may be used in order to control different flow rates, of different beverages, for achieving a variety of texture production. For example, increasing the flow rate of the beverage may produce a slush drink with a texture that is softer. In one embodiment, a motorized water flow control valve may be used, as a beverage valve, and it may be controlled via a closed loop control circuitry, e.g. analog or digital circuitry, that is attached to a flow sensor, installed in line with the water flow. In some embodiments an electrical pump may be used such as a peristatic, diaphragm, centrifugal or any other liquid pump which its water consumption and pressure can be regulated by applying a controlled signal, such as PWM, to its motor. In other embodiments, a pneumatic pump may be used where the liquid gas flow can be used to operate a pneumatic motor operating the pump, such as a peristatic, a diaphragm or a centrifugal pump, before being released into the chamber. An electrical water flow regulator can also be used to further control the water flow for a set gas flow.

In one embodiment, at least one gas expansion nozzle(s), may be inserted in the chamber, for jetting gas on the beverage droplets, in the chamber. In one embodiment, 3 gas expansion nozzles may be used. In one embodiment the gas expansion nozzles are attached to a pipe that is connected to the gas source, where the gas may flow from the gas source through the pipe and through the gas expansion nozzles and into the insulated chamber. In one embodiment, the gas nozzles are located between 0-200 mm below the whirlpool core and/or between 0-200 mm above the beverage atomizing nozzles. In other embodiments, the number, type, and location of the gas expansion nozzles may be determined according to the other fixed parameters and the desired end product.

In one embodiment, at least one gas flow regulator(s) may be disposed between the gas source and the gas nozzle(s) for regulating the gas flow rate, in its liquid phase, into said gas expansion nozzle(s). In one embodiment a passive, manual or constant, flow regulator may be used. In one embodiment, a gas cylinder is used which is equipped with needle valve, at its output, where the gas pressure, in the cylinder, pushes outward effectively causing it to close the output of the cylinder. Thus, a passive flow regulator may be used that applies pressure on the needle valve for letting the gas flow out. The ratio, between the external force and the internal force acting on the valve, determine the outgoing gas flow rate from the cylinder. In one embodiment, the passive flow regulator may be a piston built from two pins with a spring between them. The piston may be placed in contact with the gas cylinder valve, as to allow the force, applied on the piston from one side, to extract gas from the cylinder while the internal gas pressure applies internal countering force from its other side. Thus, the spring's constant force is set so as to cause a relatively constant flow rate of gas from the gas cylinder, throughout the possible gas pressure span. In other words, the minimum needle penetration shall occur during the maximum gas pressure phase while the maximum needle penetration shall occur during the lowest pressure phase, when the gas cylinder is almost empty.

In another embodiment, a flow sensing-based flow regulation may be used. In this embodiment, a flow sensor may be installed in line with the gas cylinder, for transducing the gas flow into electrical signal, which may be used in a closed loop with a linear actuator, e.g. electrical, pneumatic or other, for presses the gas cylinder needle valve. This closed loop, that controls the activation of the linear actuator, may be used to maintain the required regulated gas flow. In other embodiments, effect-based flow regulation may be used. In this embodiment a control loop may be closed all the way to the required effect of the gas. In any case the regulated gas flow is used to maintain the internal ambient of the chamber to the optimal condition of set ice product texture production during the entire process.

In one embodiment, a temperature sensor in the chamber may be used for transducing the temperature in the chamber into electrical signal, which through a closed loop control circuitry, e.g. analog or digital circuitry, may activate a linear actuator, e.g. electrical or pneumatic, which may press the gas cylinder needle valve in order to maintain the required regulated gas flow to produce the required temperature.

In one embodiment, a combination of temperature and moisture sensors can be used for further precision of the effect-based gas flow regulation for maintaining the ice to water ratio of the end product.

In other embodiments, other types of cylinder valves, such as ball valve or other, may be used by changing the linear actuator to the proper electro mechanical apparatus, such as rotary actuators.

In one embodiment, two reservoirs of gas may be used in order to compensate for the pressure drop in the cylinder below liquidation conditions, which causes the gas to transform from liquid to gas inside the cylinder. One reservoir may be used for storage of the gas, in which the gas shall be used, and a secondary reservoir shall be placed after a compressor which can intake the gas from the main reservoir and maintain a pressure of above 10 atms, for example, in the secondary reservoir until the main reservoir is almost completely drained. Thus, using more gas per main reservoir.

In on embodiment, an external gas supply may be used as the system's gas supply instead of or in conjunction of internal reservoirs. Such systems may be more commonly used for gasses such as $N_2$ or $CO_2$.

Figure 4:
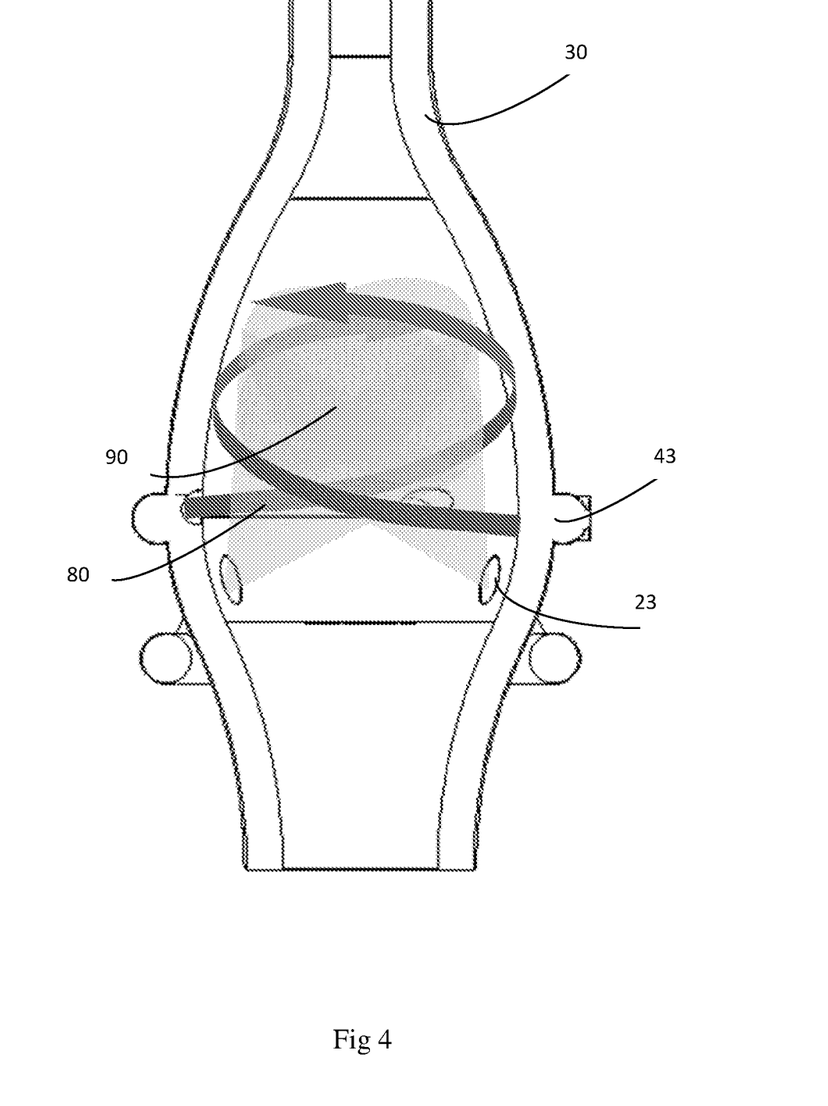
FIG. 4 is a diagram of a side view of the cross section of the thermally insulated food grade material chamber, according to an embodiment of the invention.

FIG. 4 is a diagram of a side view of the cross section of the thermally insulated food grade material chamber, according to an embodiment of the invention. In this embodiment, the chamber may have a geometry for creating a whirlpool effect. The injected gas, which is influenced by the nozzles alignment and type, which may be fixed at production level, and the gas flow rate, together with the beverage injection angle and flow, may create various interaction areas similar to a whirlpool affect. Thus, the interaction of geometry, volume, content and thermodynamic parameters during the process, and using time, may form a texture controlled edible ice product In FIG. 4 the beverage is sprayed from the atomizing nozzles, such as nozzle 23, while the gas is transformed from liquid state to gaseous state while expanding from the gas expansion nozzles, such as nozzle 43. The expanded gas is jetted from the nozzles on the sprayed beverage droplets, at meeting points, such as meeting point 80, in the thermally insulated chamber 30. The evaporation process of the jetted gas extracts heat from the beverage droplets causing the beverage droplets temperature to drop below the freezing point, thus becoming ice nuclei in the meeting points. The iced nuclei may then collide with other ice nuclei, at the cloud core 90, effectively becoming beverage-flakes, e.g. edible snowflakes, in the insulated chamber 30. The beverage-flakes may eventually drop out of the insulated chamber as texture controlled edible ice product.

Figure 5:
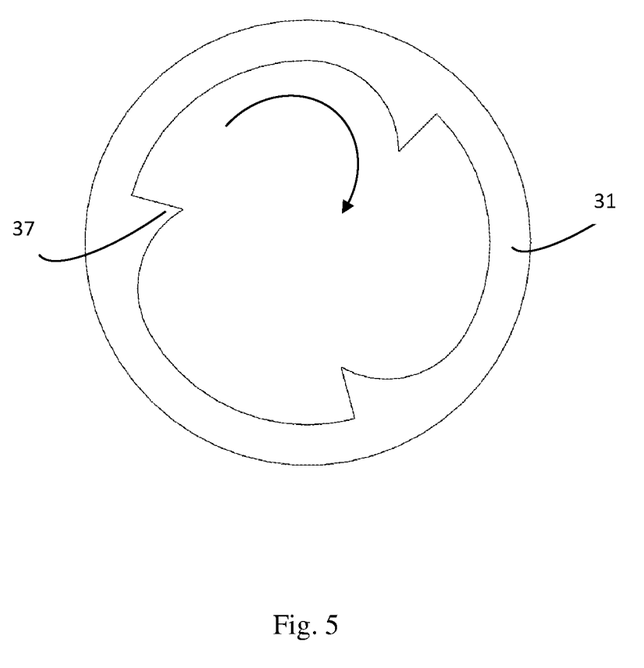
FIG. 5 is a diagram of a top view of the cross section of the thermally insulated chamber with flaps, according to another embodiment of the invention.

FIG. 5 is a diagram of a top view of the cross section of the thermally insulated food grade material chamber with flaps, according to an embodiment of the invention. In this embodiment, the chamber 31 may have flaps, such as flap 37, and the chamber 31 may have a fixed aerodynamic flap like geometry. This geometry may push the whirlpool away from the sides of the chamber 31 towards the center in order to decrease the interaction between the whirlpool and the sides of the chamber thus decreasing ice formation on the inner sides of the chamber 31.

Figure 6:
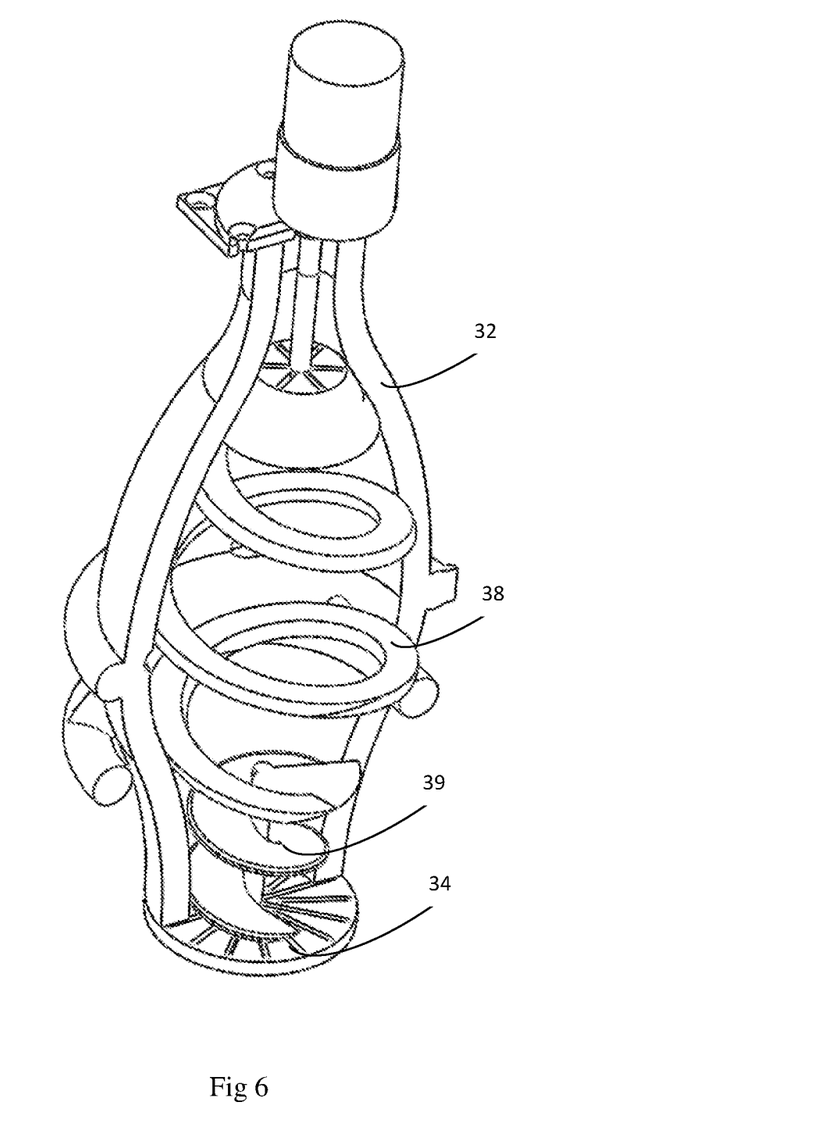
FIG. 6 is a diagram of a side view of the cross section of a thermally insulated chamber with a rotating spiral, according to an embodiment of the invention.

FIG. 6 is a diagram of a side view of the cross section of a thermally insulated chamber with a rotating spiral, according to an embodiment of the invention. In this embodiment, the chamber 32 may have a rotating spiral, such as spiral 38, with an edge in order to scrape the icing formations accumulated on the chamber 32 inner surface. In one embodiment, the rotating spiral 38 may be made of stainless-steel, and its edge may be designed to scrape the chamber's inner surface at a distance of 0.5-1 mm. In one embodiment, an extrusion device, such as the Archimedes screw 39, may be located at the center of the dispensing end of the chamber 32. The extrusion device may rotate during the process, of jetting the sprayed beverage with gas, as to push the iced beverage from the chamber outwards. In one embodiment, a shredder, such as blade 34, located at the output side of the chamber, may further control the beverage-flakes' size. The speed of the blade and its shape can determine the final processing effect on the end product.

In one embodiment, the beverage reservoir may also be cooled by a standard compressor based cooling system. In another embodiments, the cooling of the beverage may be made when the beverage flows towards the chamber, using a heat exchange system for example. In other embodiments, the beverage may not be cooled at all.

In one embodiment, the liquid gas can be used as the cooling agent running through the heat exchange to cool the beverage to the required temperature.

In one embodiment, a controller, such as a controller from the MSP430 family by Texas Instruments, or any other Microcontroller or CPU, may be used for controlling said beverage valve(s) and said gas flow regulator(s). The controller may be running a software to control the system and to interface as required. In one embodiment, the controller may control the beverage valve(s) and the gas flow regulator(s) for ensuring that the sprayed beverage droplets meet the jetted gas stream(s) for freezing the droplets and thus forming a texture controlled edible ice product in the thermally insulated chamber.

In one embodiment, flavor nozzles may be added in order to inject flavors in the end product, such as juices, coffee, tea, beverages, alcohol or liquors. In an embodiment, when alcohol is injected, it may be injected before or after the process so as not to compromise the icing process.

In one embodiment the apparatus may be used to produce different textures for different ice products. The set of parameters and the timing of the application of each parameter value during the process is referred to hereinafter as the "product recipe", or the "recipe" in short. The controller may be equipped with the means to yield data from the apparatus sensors and operate the control circuitry to control the apparatus and effect the parameters as described above. The software part of this capability may be enclosed in specific Application Proprietary Interface (API) which is like a script language setting the parameter state step by step during the process according to a predetermined recipe. The recipe may be determined per product, e.g. by flavor or substance, and may be one way hashed encrypted, such as MD5 or proprietary one-way hash function, along with serial number or other unique data identifiers and branded to the product capsule by the means of barcode, RFID tag or other. The apparatus controller may then read the recipe from the capsule, once the capsule is introduced to the apparatus, and dials the apparatus control circuitry for processing the branded recipe so as to achieve the same texture, and/or flavor, production for same product each time.

In one embodiment, liquid gas may be used to reduce the chamber ambient temperature to the required temperature by injecting it to the chamber prior to the process initiation to achieve the recipe start temperature condition.

In one embodiment, the chamber may be treated as a small freezer, running the cooling ribs, e.g. expansion pipe, around the chamber for lowering its ambient temperature below the required freezing temperature per recipe. In other embodiments, Peltier plates may be installed around the chamber for lowering its ambient temperature below the required freezing temperature per recipe. Other ambient cooling options may be used as well.

In one embodiment, the controller controls the beverage valve(s) and the gas flow regulator(s) in order to create a desired texture(s) of the iced edible product consistently. In one embodiment, the controller controls the beverage valve(s) and the gas flow regulator(s) in order to create a desired texture(s) of the iced edible product consistently for a certain flavor, that is the controller may create the same texture for the same flavor each time.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. An apparatus for producing edible ice products comprising:
   a thermally insulated food grade material chamber;
   at least one atomizing beverage nozzle(s) inserted in said thermally insulated chamber for spraying beverage droplets into said thermally insulated chamber;
   at least one beverage valve(s), disposed between a beverage source and said atomizing beverage nozzle(s), for controlling a beverage flow rate into said chamber;
   at least one gas expansion nozzle(s), inserted in said thermally insulated chamber, for expanding a food grade liquified gas from its liquid state to its gaseous state, and for jetting the food grade gas over said sprayed beverage droplets when droplets are formed, in order to cool and freeze droplets onto ice nuclei immediately prior to being dispensed in a cup, in said thermally insulated chamber;
   at least one gas flow regulator(s), disposed between a gas source and said gas expansion nozzle(s) for regulating a gas flow rate into said gas expansion nozzle(s);
   a controller for controlling said beverage valve(s) and said gas flow regulator(s); and
   wherein said controller controls said beverage valve(s) and said gas flow regulator(s) for ensuring that said sprayed beverage droplets meet the jetted gas for freezing said droplets for forming a texture controlled edible ice product in said thermally insulated chamber.

2. The apparatus according to claim 1, further comprising a shredder for texture processing.

3. The apparatus according to claim 1, where the beverage source is a capsule.

4. The apparatus according to claim 3, where the capsule has a predefined recipe, and where the controller can read said recipe and can control the beverage valve(s) and the gas flow regulator(s) according to said recipe.

5. The apparatus according to claim 1, where the controller can control the beverage valve(s) and the gas flow regulator(s) according to the beverage from the beverage source and according to the desired texture of the edible iced product.

6. The apparatus according to claim 5, where the controller controls the beverage valve(s) and the gas flow regulator(s) according to a predefined recipe.

7. The apparatus according to claim 6, where the recipe is entered to the apparatus from an external source.

8. The apparatus according to claim 5, where the controller controls the beverage valve(s) and the gas flow regulator(s) in order to create a desired texture(s) of the edible iced product consistently.

9. The apparatus according to claim 1, where the chamber has a rotating spiral edge, for scraping icing formations accumulated on the chamber inner surface.

10. The apparatus according to claim 1, where the chamber has an Archimedes screw.

11. The apparatus according to claim 1, where the food grade liquified gas is selected from the group consisting of $N_2$, $CO_2$, and air.

* * * * *